July 8, 1958 — W. G. HARVEY — 2,841,824
FEED MECHANISM FOR INJECTION MOLDING MACHINE
Filed Nov. 9, 1953
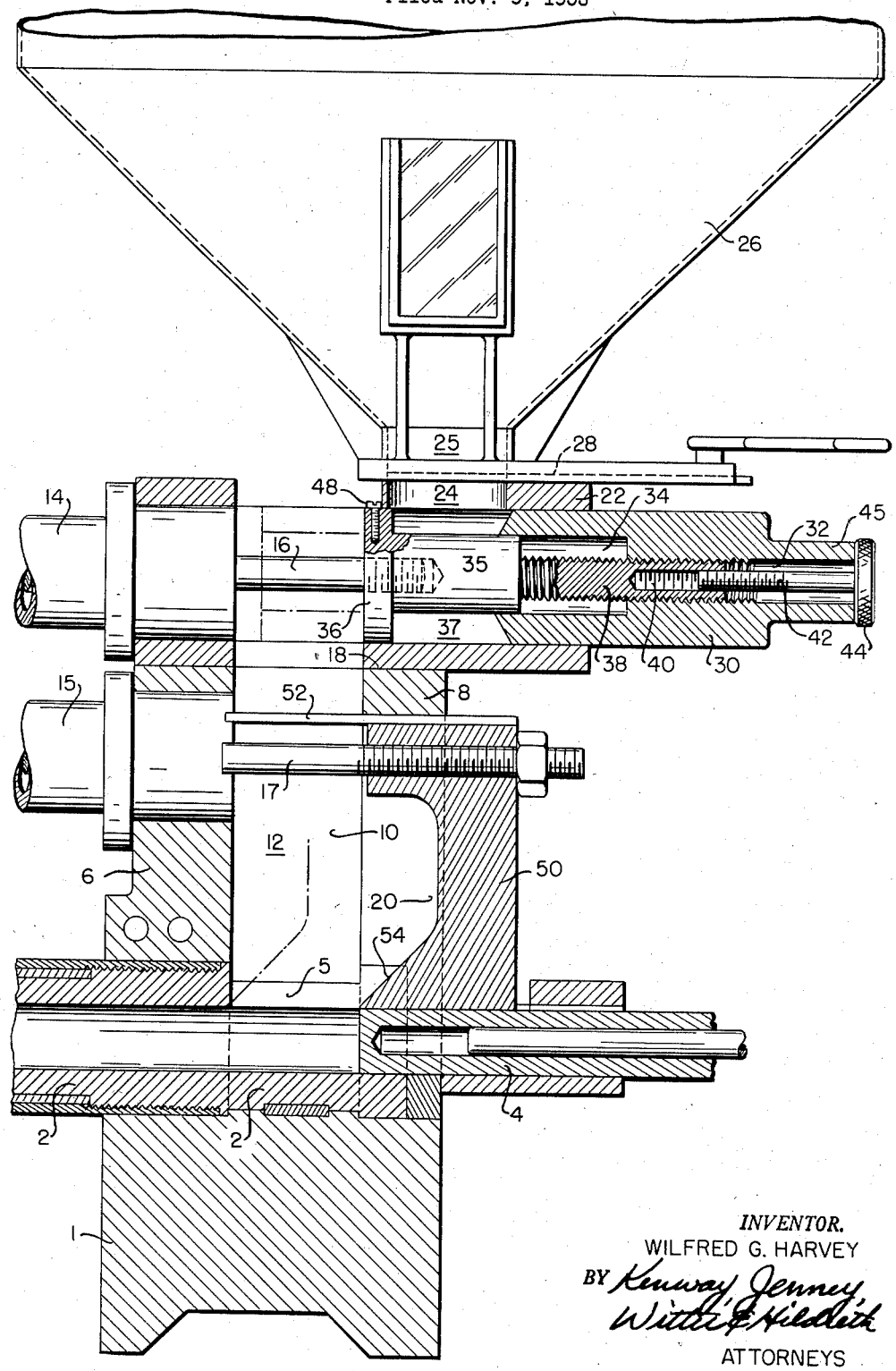
INVENTOR.
WILFRED G. HARVEY
BY Kenway Jenney
Witter & Hildreth
ATTORNEYS United States Patent Office 2,841,824
Patented July 8, 1958

2,841,824

FEED MECHANISM FOR INJECTION MOLDING MACHINE

Wilfred G. Harvey, Leominster, Mass.

Application November 9, 1953, Serial No. 390,883

3 Claims. (Cl. 18—30)

In injection molding operations it is not only necessary to provide a reliable means for feeding metered quantities or charges of the thermoplastic material from the supply hopper to the injection cylinder, but also to inject a full charge into the mold during each operating cycle. It has been found that the gravitational flow of the thermoplastic material in response to successive operations of a flow control valve cannot be relied upon to deliver to the injection cylinder accurately metered quantities of the material, and even where a full charge is delivered to the injection cylinder, the forward movement of the plunger has a tendency to force a part of the thermoplastic material back into the delivery duct with the result that a full uniform charge of the material is not injected into the mold.

The principal objects of the invention are to provide an efficient and reliable feed mechanism which overcomes the aforementioned difficulties and to provide a feed mechanism capable of being readily adjusted so as to vary the quantity of thermoplastic material injected into the mold.

Further objects and advantages will be apparent from a consideration of the following description and the accompanying drawing, wherein the figure is a vertical section through that part of an injection molding machine embodying a feed mechanism constructed in accordance with the present invention.

The embodiment herein shown for the purpose of illustration comprises a base member 1 horizontally bored to receive a composite injection cylinder 2 in which an injection plunger 4 reciprocates, the cylinder 2 and plunger 4 being connected with the usual operating mechanisms which are well known to those in the art and disclosed in such standard texts as the Handbook of Plastics, by Simonds and Ellis (D. Van Nostrand Co.). The upper part of a cylinder 2 is formed with an elongate slot 5, the inner end of which defines a feed opening for plastic material.

Integral with the base 1 and extending above the cylinder 2 is an enclosure having walls 6, 8 and 10 which collectively define a vertical discharge duct or chute 12, the lower end of which communicates with the feed opening 5. The wall 6 is formed with vertically spaced openings which receive the ends of pressure cylinders 14 and 15 having pistons which carry rods 16 and 17, respectively. The upper part of wall 8 is formed with a circular opening 18 horizontally aligned with the cylinder 14 and the lower end of the wall 8 is formed with a vertically extending opening 20 aligned and communicating with the slot 5.

One end of a cylinder 22 is mounted within the opening 18 so that its open inner end communicates with the upper end of the chute 12. The upper part of the cylinder 22 adjacent to its inner end is formed with a feed opening 24 vertically aligned with the discharge port 25 of hopper 26 which holds a supply of thermoplastic material, the delivery port 25 having the usual slide 28 for closing the port.

Slidably mounted within the cylinder 22 is a composite piston comprising a main piston member 30 formed with an axial opening 32, the inner end of which is enlarged to provide a cylindrical opening 34 which receives the inner end of a stud-like member 35. The outer end of the member 35 is formed with an annular flange 36 having a diameter conforming to that of the main piston member. The stud member 35 is rigidly connected to the outer end of piston rod 16 with the flange 36 spaced from the inner end of the piston 30 so as to define a circumferential groove or chamber 37 vertically aligned with the feed opening 24 when the parts are in retracted position, as shown by the full lines.

The inner end of the stud 35 is connected with one end of an adjusting screw 38 threaded into the opening 32 and the other end of this screw is provided with a threaded bore 40 which receives one end of a locking screw 42. The other end of the locking screw 42 carries a head 44 engageable with the reduced end 45 of piston 30 to lock the parts together. When the locking screw 42 is released the piston 30 may be rotated in one direction or the other to effect relative inward and outward movement of the piston and stud, thereby varying the length and hence the capacity of the circumferential groove or chamber 37. Outward movement of the piston and stud and also rotational movement of the stud are limited by the engagement of a stop screw 48, carried by flange 36, with the inner end portion of the cylinder 22.

The piston 30 and associated parts are movable by rod 16 from retracted position to advanced position, shown by the broken lines, wherein the groove portion 37 is disposed within the upper part of the delivery duct 12, thereby causing a predetermined or metered charge of material received from hopper 26 to drop downwardly through the duct into the injection cylinder 2.

Rigidly secured to the outer end of the piston rod 17 is a depending closure member or segment 50 having a sliding fit in the opening 20 and slot 5 which with a horizontal plate or flange 52 provide guides for the closure. The lower or active part of the closure 50 is segment-shaped with a bottom surface having the same curvature as the inner face of the injection cylinder 2 so that when moved from retracted position (shown in the full lines) to advance position (shown in the dotted lines) it not only fits within and completely closes the feed openings, but also embraces the plunger 4 so as to prevent any part of a charge in the cylinder 2 from being pushed back through the feed opening. The inclined inner face 54 of the closure tapers to a relatively sharp edge to cut through any material extending upwardly into the feed opening 5, thereby insuring complete closing of the feed opening.

The cylinders 14 and 15 are of conventional design and construction and are connected with a suitable source of compressed air or other operating fluid and associated control valves (not shown) operative to control the flow through the pressure lines so as to reciprocate the pistons sequentially and in timed relation to the reciprocation of the plunger 4 so that a charge of thermoplastic material is first delivered to the cylinder 2, after which the closure member 50 is operated, followed by the operation of plunger 4.

A summary of the operation is as follows:

Assuming that the hopper 26 contains an adequate supply of granular thermoplastic material, that the relative position of the stud 35 and piston 30 has been adjusted so that the circumferential groove 37 holds a predetermined quantity of plastic material, and that the parts are in the position shown by the full lines, the opening of slide 28 permits the thermoplastic material to flow by gravity into the circumferential groove or chamber 37, filling it completely, and the machine is now ready to put in operation. The control valves associated with the cylinders 14 and 15 automatically operate first to admit fluid to one end of the cylinder 14 so as to move piston 30 and associated parts to advanced position, thereby causing the thermoplastic material delivered to groove 37 to be dumped into the chute 12 and passed through the feed opening 5 into the injection cylinder 2. The control valves then operate to admit fluid to one end of the cylinder 15 to move the segment 50 to advanced position, thereby completely closing the feed opening 5, and thereafter the control valves operate to advance the plunger 4. Simultaneously with or shortly after the operation of the segment 50 fluid is admitted to the other end of cylinder 14 so as to retract the piston 30 and associated parts, after which the control valves operate to retract the segment 50 and plunger 4, thus completing the operating cycle which is repeated several times a minute.

It will be noted that the design of a feeding mechanism is such that accurately metered quantities of material are transferred from the hopper to the injection cylinder in a most efficient and reliable manner, and that prior to the advancing of the plunger 4 the sliding segment or closure 50 completely seals off the injection cylinder, thereby positively preventing any material from being carried or pushed back into the delivery chute.

A further feature of the invention is the design of the metering device which may be quickly adjusted to handle greater or smaller quantities of material as may be necessary to suit the requirements of the object to be molded, simply by rotating the piston 30 which may be locked in any position of adjustment by the screw 42.

While I have shown and described one desirable embodiment of the invention it is to be understood that this disclosure is for the purpose of illustration and that various changes and modifications may be made without departing from the spirit and scope of the invention as set forth in the appended claims.

I claim:

1. In an injection molding machine of the type having an injection cylinder with a feed opening between its ends, and an injection plunger reciprocable within said cylinder from a retracted position, wherein its end is clear of said feed opening, to an advanced position, wherein its body portion extends beyond said feed opening, mechanism for intermittently feeding predetermined charges of plastic material to said injection cylinder, comprising supply means for thermoplastic material disposed above said cylinder, an upstanding delivery duct having its lower end communicating with said feed opening and its upper end communicating with said supply means, a closure member mounted on the outside of said cylinder with its lower part projecting into said feed opening, the inner face of said lower part conforming to the curvature of the inside of said cylinder, said closure member being movable from a retracted position, wherein the communication between said feed opening and delivery duct is unimpaired, to an advanced position within said delivery duct, wherein the closure member enters said feed opening, and means for successively advancing said closure member and plunger and thereafter retracting them.

2. In an injection molding machine of the type having an injection cylinder with a feed opening between its ends, and an injection plunger reciprocable within said cylinder from a retracted position, wherein its end is clear of said feed opening, to an advanced position wherein its body portion extends beyond said feed opening, mechanism for intermittently feeding predetermined charges of plastic material to said injection cylinder, comprising supply means for thermoplastic material disposed above said cylinder, an upstanding delivery duct having its lower end communicating with said feed opening and its upper end communicating with said supply means, a closure member slidably mounted on the outside of said cylinder, the wall of said cylinder being slotted to form said feed opening and provide guideways for slidably supporting the lower part of said closure member, said lower part being segment-shaped with a curvature conforming to that of the inside of said cylinder and the leading edge of said segment-shaped part being tapered, said closure member being movable from a retracted position outside said delivery duct, wherein the communication between said feed opening and delivery duct is unimpaired, to an advanced position within said delivery duct, wherein the closure member enters said feed opening, and means for successively advancing said closure member and plunger and thereafter retracting them.

3. In an injection molding machine of the type having an injection cylinder with a feed opening between its ends, and an injection plunger reciprocable within said cylinder from a retracted position, wherein its end is clear of said feed opening, to an advanced position, wherein its body portion extends beyond said feed opening, mechanism for intermittently feeding predetermined charges of plastic material to said injection cylinder, comprising a supply hopper mounted above said cylinder, a delivery duct connecting said hopper and cylinder, a horizontally disposed cylindrical member mounted beneath said hopper and having an open end communicating with the upper part of said delivery duct, said cylindrical member having a delivery opening at its upper part communicating with said hopper so that the material therein may flow through said opening, an elongate piston mounted in said cylindrical member and formed at one end with an axial opening, a stud slidably mounted in said axial opening, the outer end of said stud having an annular flange which with the adjacent end of said piston defines an annular recessed portion registering with said delivery opening when said piston is in retracted position so as to receive material flowing therethrough, said piston being slidable from retracted position to an advanced position, wherein said recessed portion is disposed within the upper part of said delivery duct so as to discharge material therein, a screw passing axially through said piston and connected to the inner end of said stud for adjusting its position relative to the piston, thereby to vary the size of said recessed portion, and means for reciprocating said piston in timed relation to the reciprocations of said plunger.

References Cited in the file of this patent

UNITED STATES PATENTS

| | | |
|---|---|---|
| 2,404,559 | Ashbaugh | July 23, 1946 |
| 2,448,947 | Arthur et al. | Sept. 7, 1948 |
| 2,480,313 | Alden | Aug. 30, 1949 |
| 2,485,523 | Ashbaugh | Oct. 18, 1949 |
| 2,514,884 | Maynard | July 11, 1950 |
| 2,627,086 | Hollenbeck | Feb. 3, 1953 |